United States Patent
Owens et al.

(10) Patent No.: US 7,848,608 B2
(45) Date of Patent: Dec. 7, 2010

(54) FIBER ROUTING SYSTEM WITH DROP-IN DEVICE

(75) Inventors: Ryan J. Owens, Hopkins, MN (US); David E. Rapp, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 4 days.

(21) Appl. No.: 12/365,730

(22) Filed: Feb. 4, 2009

(65) Prior Publication Data

US 2009/0196564 A1 Aug. 6, 2009

Related U.S. Application Data

(60) Provisional application No. 61/026,193, filed on Feb. 5, 2008.

(51) Int. Cl.
*G02B 6/00* (2006.01)

(52) U.S. Cl. .................................. 385/135; 385/134

(58) Field of Classification Search ......... 385/134–136
See application file for complete search history.

(56) References Cited

U.S. PATENT DOCUMENTS

| | | | |
|---|---|---|---|
| 2,823,056 A | 2/1958 | Di Meo et al. | |
| 5,067,678 A * | 11/1991 | Henneberger et al. | 248/68.1 |
| 5,316,243 A | 5/1994 | Henneberger | |
| 5,752,781 A | 5/1998 | Haataja et al. | |
| 6,359,217 B1 | 3/2002 | Thompson et al. | |
| 6,429,376 B1 | 8/2002 | Mendoza | |
| 6,448,495 B1 * | 9/2002 | Mattei et al. | 174/507 |
| 6,535,683 B1 * | 3/2003 | Johnson et al. | 385/136 |
| 6,559,378 B1 * | 5/2003 | Bernard | 174/481 |
| 6,708,918 B2 * | 3/2004 | Ferris et al. | 242/615 |
| 6,709,186 B2 | 3/2004 | Ferris et al. | |
| 6,715,719 B2 | 4/2004 | Nault et al. | |
| 6,739,795 B1 * | 5/2004 | Haataja et al. | 403/387 |
| 7,226,022 B2 * | 6/2007 | Bernard et al. | 248/68.1 |
| 7,315,680 B1 * | 1/2008 | Rapp et al. | 385/134 |
| 7,627,224 B1 * | 12/2009 | Cassidy et al. | 385/135 |
| 7,742,675 B2 * | 6/2010 | Sayres et al. | 385/137 |
| 2002/0094184 A1 * | 7/2002 | Mattei et al. | 385/134 |
| 2002/0160660 A1 | 10/2002 | Mendoza | |
| 2004/0017993 A1 * | 1/2004 | Wentworth et al. | 385/136 |
| 2005/0092505 A1 | 5/2005 | Mendoza | |
| 2008/0175554 A1 * | 7/2008 | Coburn et al. | 385/136 |

(Continued)

FOREIGN PATENT DOCUMENTS

EP 0 626 599 A1 11/1994

OTHER PUBLICATIONS

International Search Report and Written Opinion mailed May 20, 2009.

(Continued)

*Primary Examiner*—Ellen Kim
(74) *Attorney, Agent, or Firm*—Merchant & Gould P.C.

(57) ABSTRACT

A fiber routing system with drop-in device protects and organizes cables entering into cabinets and racks and then transports the cables within the cabinets or racks to equipment or connection locations. A drop-in device associated with the fiber routing system manages the cables extending vertically into the fiber routing system and conveys the cables to a horizontal component. Cable storage is also provided.

11 Claims, 20 Drawing Sheets

U.S. PATENT DOCUMENTS

2009/0297112 A1* 12/2009 Mertesdorf et al. ......... 385/135
2010/0006317 A1    1/2010 Hruby et al.

OTHER PUBLICATIONS

ADC FiberGuide® System Express Exit™ 2X2, *ADC Telecommunications, Inc.*, 2 pages (May 1999).

ADC Glide Cable Management Cross-Connect and Inter-Connect Guide, *ADC Telecommunications, Inc.*, ADCP-92-016, Issue 2, pp. 1-12 (Jul. 2002).

Fiber Breakout Bay Cable Routing Guide, *ADC Telecommunications, Inc.*, ADCP-90-329, Issue 1, pp. 1-8 (May 2002).

FiberGuide® Fiber Management Systems, *ADC Telecommunications, Inc.*, pp. 1-34 (Jun. 1998).

Plenum FiberGuide® Fiber Management System, *ADC Telecommunications, Inc.*, pp. 1-11 (Oct. 1993).

U.S. Appl. No. 11/906,330, filed Oct. 1, 2007 entitled "Telecommunications Frame Including an Internal Cable".

* cited by examiner

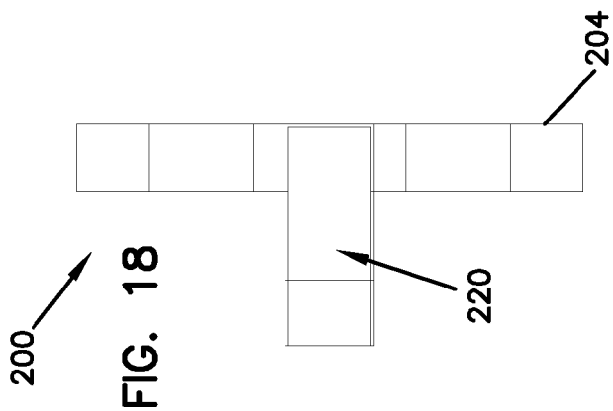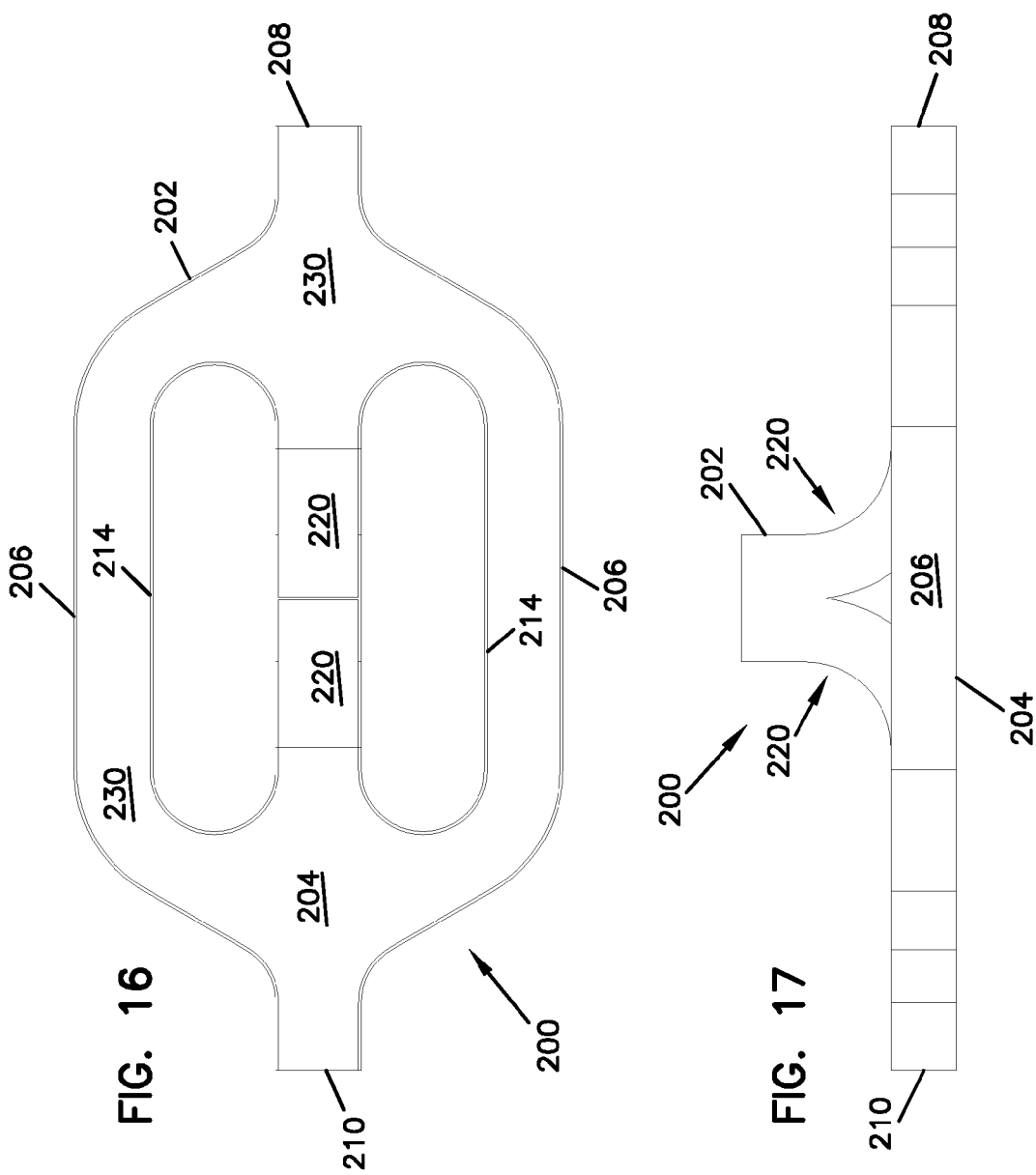

ably downwardly into a horizontal portion of system 10.

FIBER ROUTING SYSTEM WITH DROP-IN DEVICE

CROSS REFERENCE TO RELATED APPLICATION

This application claims the benefit of U.S. Provisional Patent Application Ser. No. 61/026,193, filed Feb. 5, 2008, which application is hereby incorporated by reference in its entirety.

BACKGROUND OF THE INVENTION

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components. For example, longitudinal trough members can be used to carry optical fibers along straight passages. Fittings can be used at intervals to accomplish bends, turns, and changes in elevation. Trumpets can be used to allow cable to enter and exit trough members at proper bend radii. The trough members, fittings, and trumpets are joined together by couplings to form the cable routing system. U.S. Pat. Nos. 5,067,678; 5,316,243; 5,752,781; 6,709,186; and 6,715,719 teach cable routing systems that include a plurality of trough members, fittings, trumpets that are joined by couplers. U.S. Pat. No. 7,315,680 concerns cable routing devices with integrated couplers.

Various concerns arise with the use of such systems. One concern is that cables which enter vertically into cabinets and racks are subject to damage unless protected and organized.

SUMMARY OF THE INVENTION

Embodiments disclosed herein related to systems for the management and routing of telecommunications cables.

One aspect relates to a fiber routing system for mounting to a cabinet for routing cables into and around the cabinet. The fiber routing system includes a drop-in device which directs cables dropping vertically downwardly into a horizontal portion of the fiber routing system. Various cable routing pathways can be provided in the fiber routing system. Cable storage areas can also be provided.

BRIEF DESCRIPTION OF THE DRAWINGS

FIG. 16 is a top view of the fiber routing system of FIG. 14.

FIG. 17 is a first side view of the fiber routing system of FIG. 14.

FIG. 18 is another side view of the fiber routing system of FIG. 14.

DETAILED DESCRIPTION OF THE PREFERRED EMBODIMENT

Figure 1:
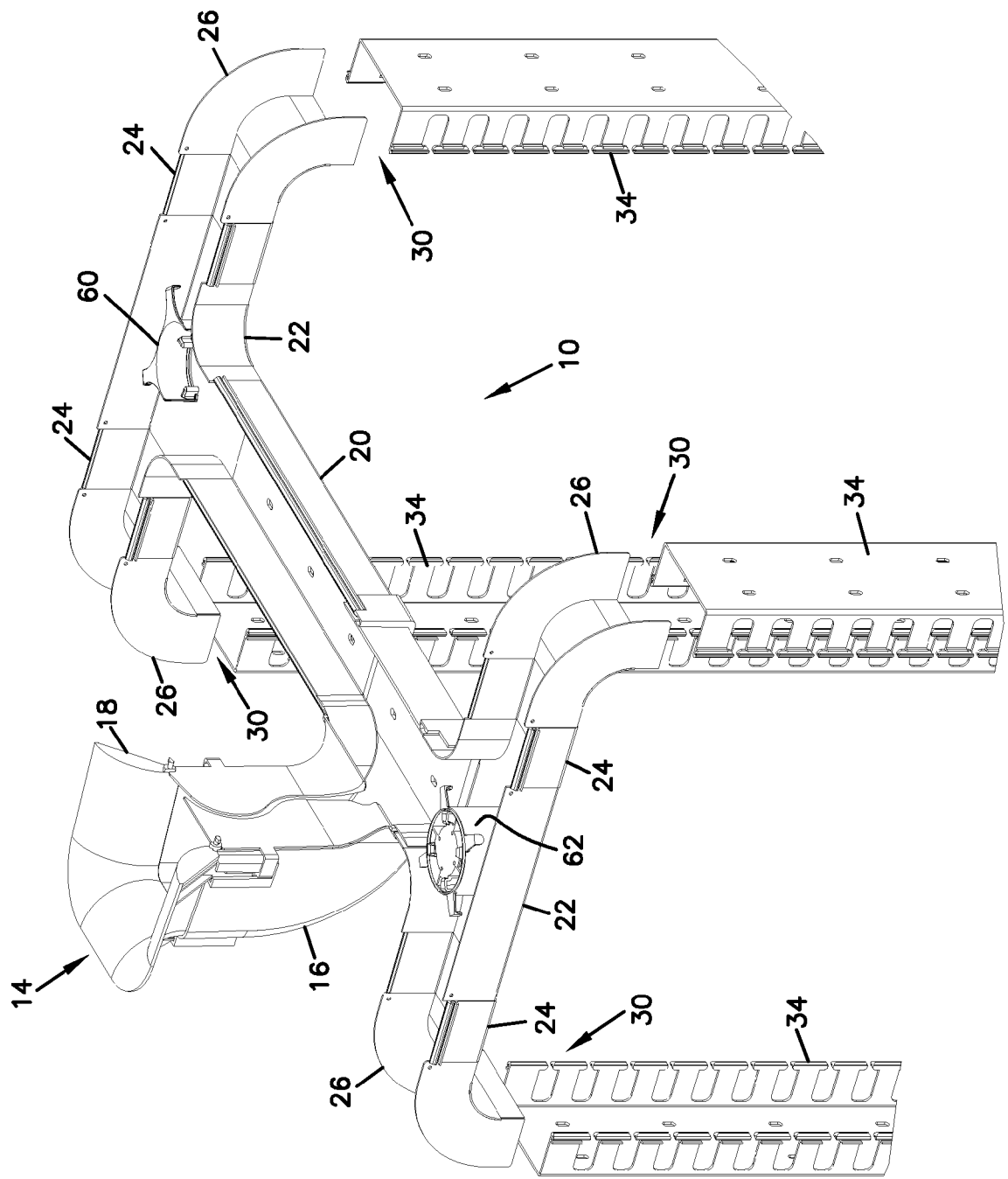
FIG. 1 is a perspective view of one embodiment of a fiber routing system.
Figure 2:
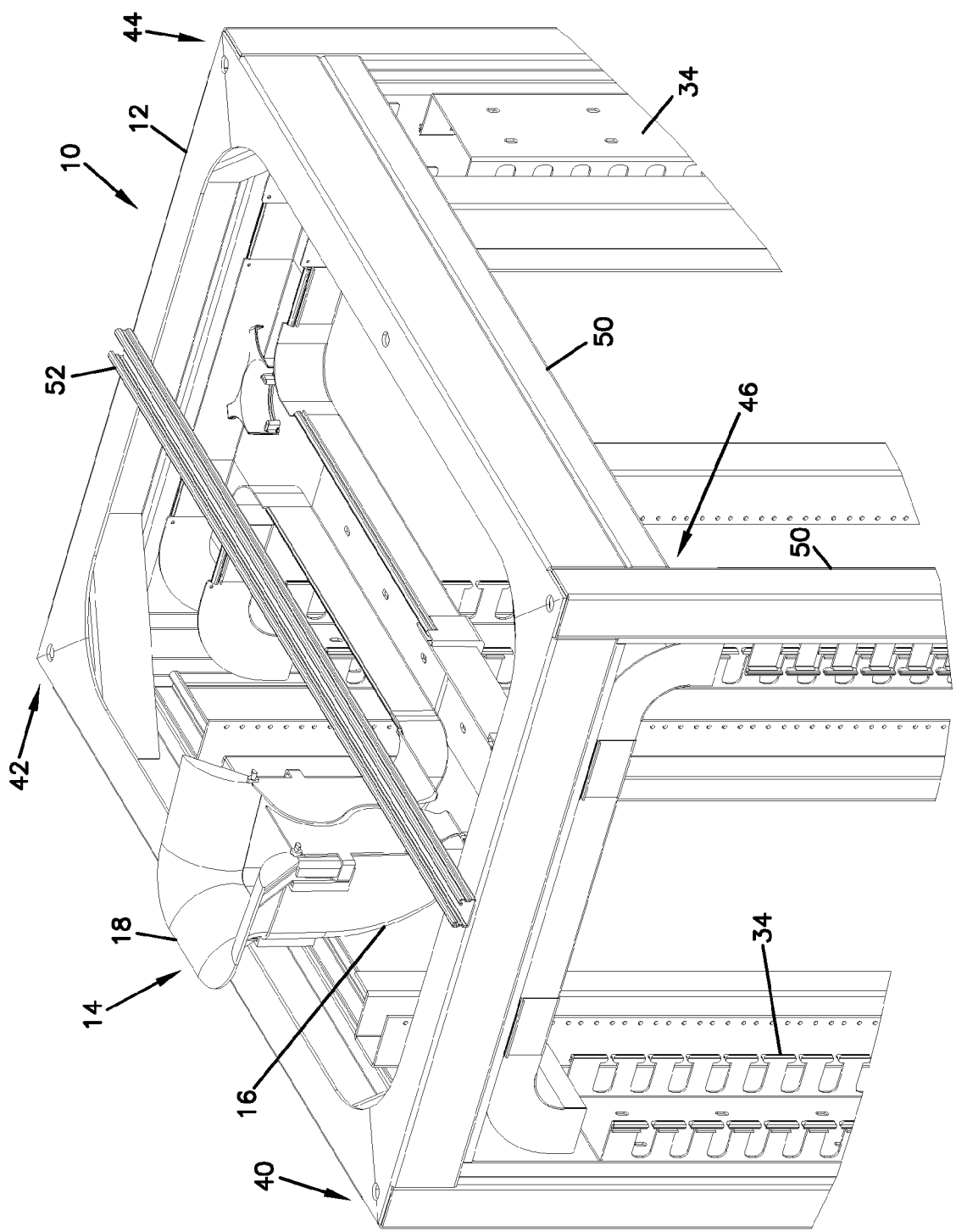
FIG. 2 shows the fiber routing system of FIG. 1 mounted to a cabinet.
Figure 3:
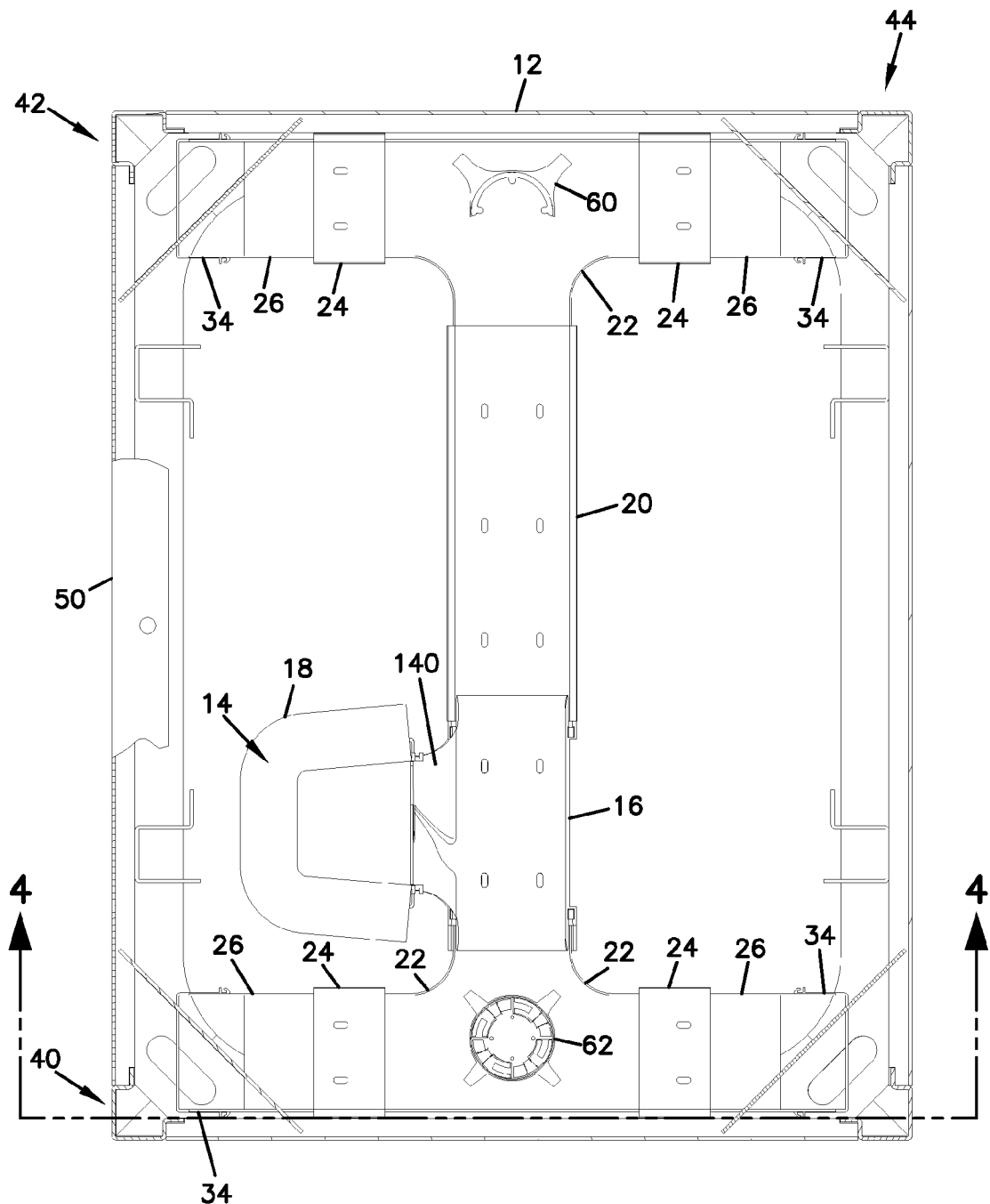
FIG. 3 is a cross-sectional top view of the system and cabinet of FIG. 2.
Figure 4:
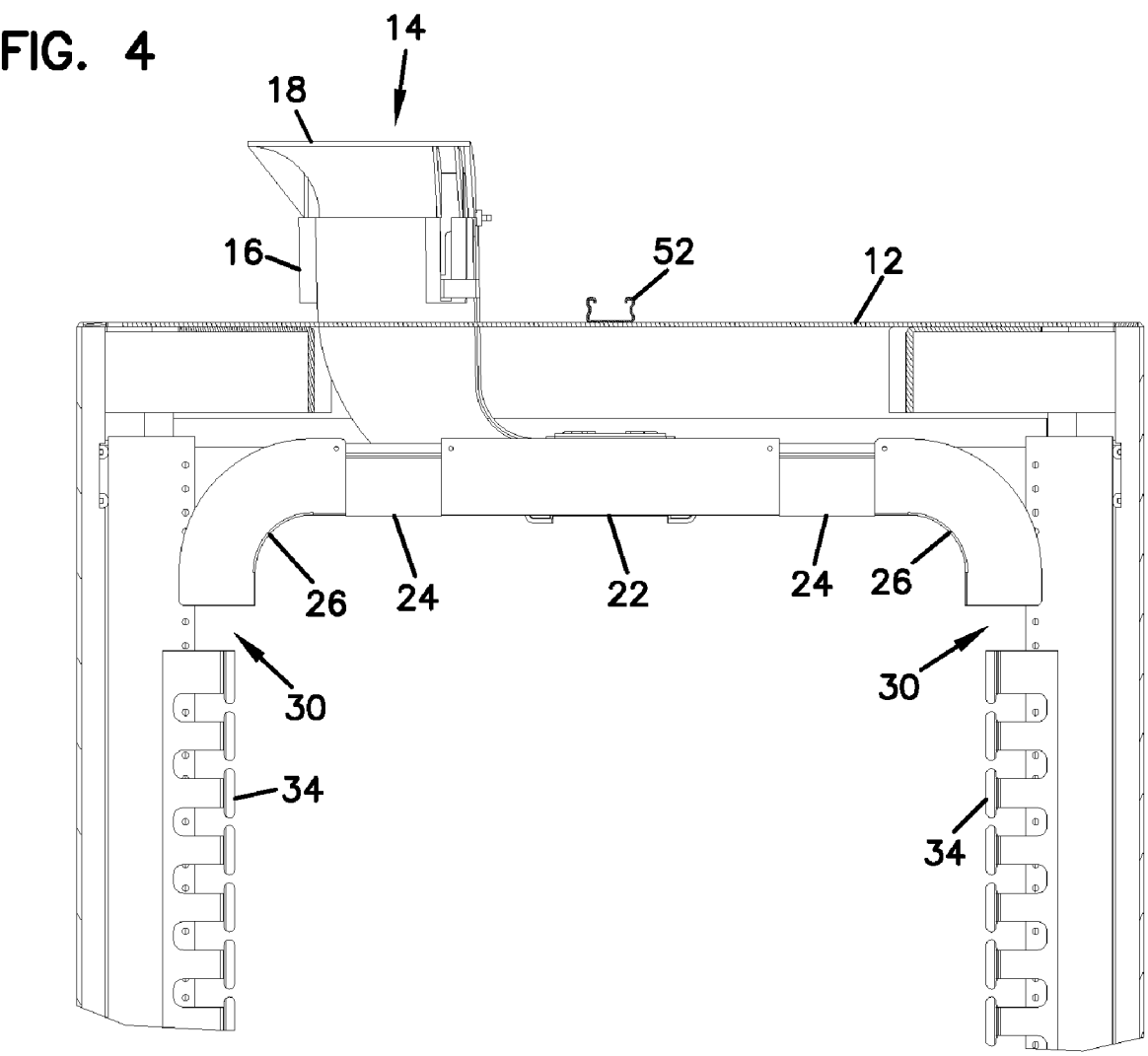
FIG. 4 is a cross-sectional front view of the system and cabinet of FIG. 2.
Figure 5:
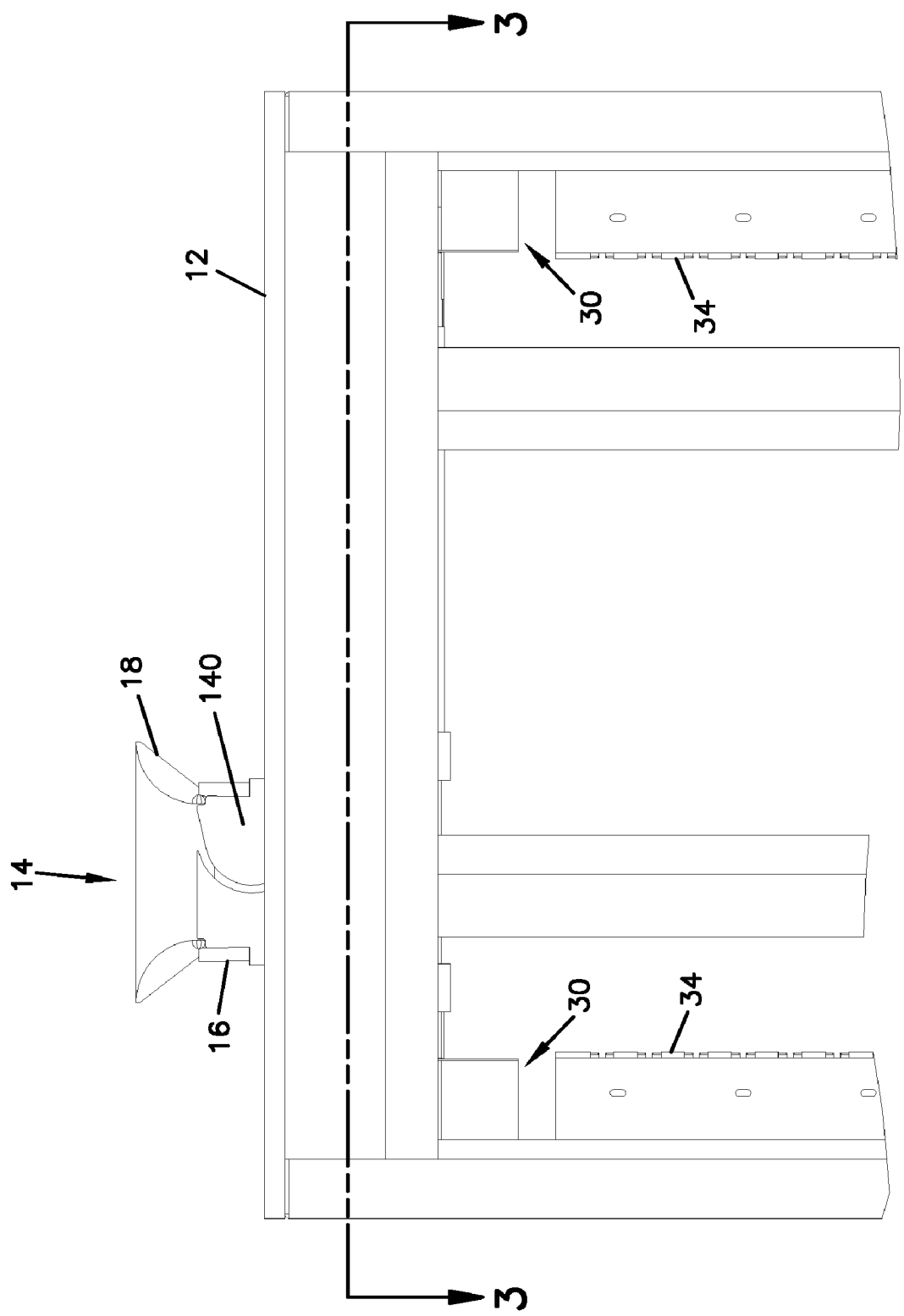
FIG. 5 is a side view of the system and cabinet of FIG. 2.
Figure 6:
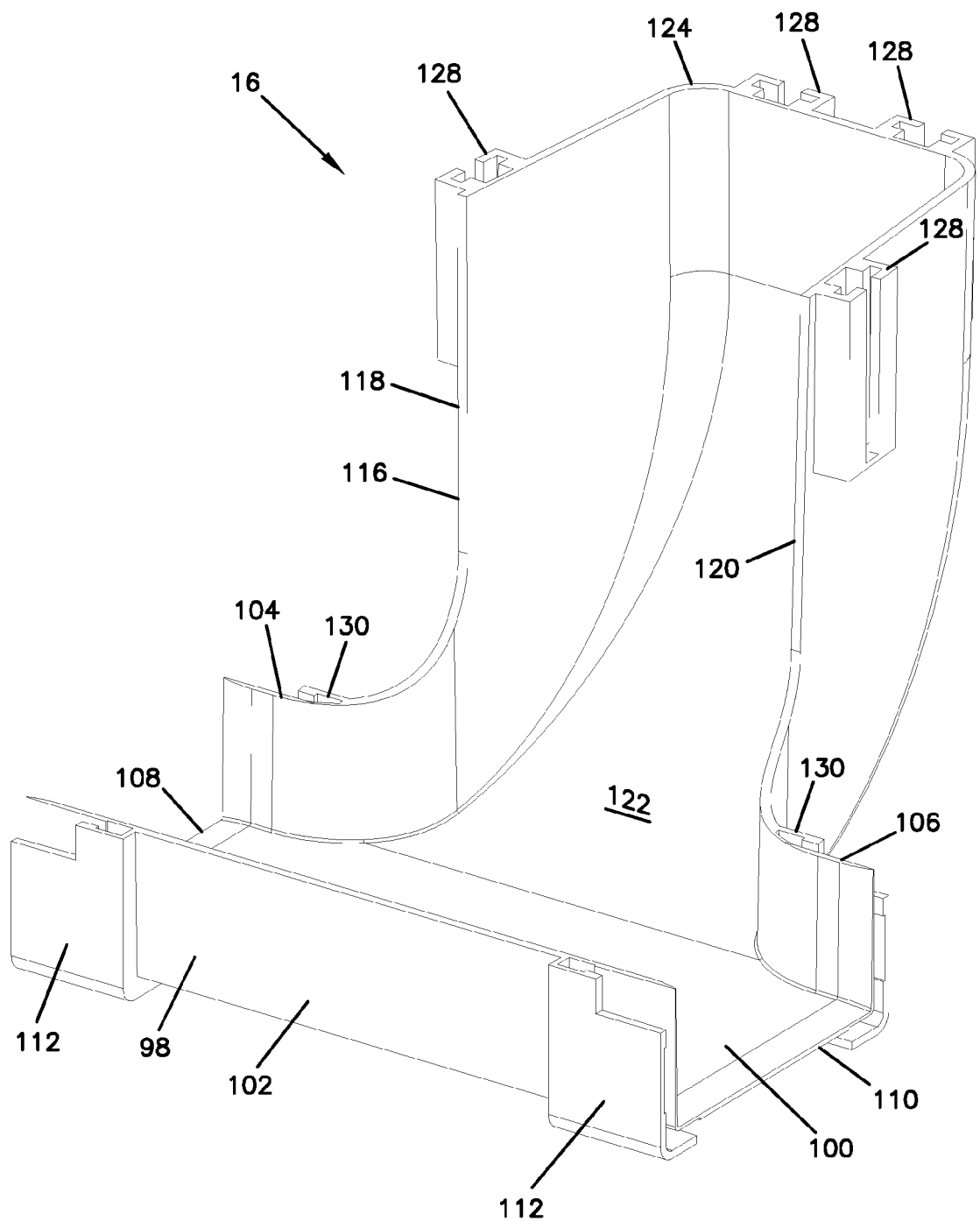
FIG. 6 is a perspective view of a drop-in device of the system of FIG. 1.
Figure 7:
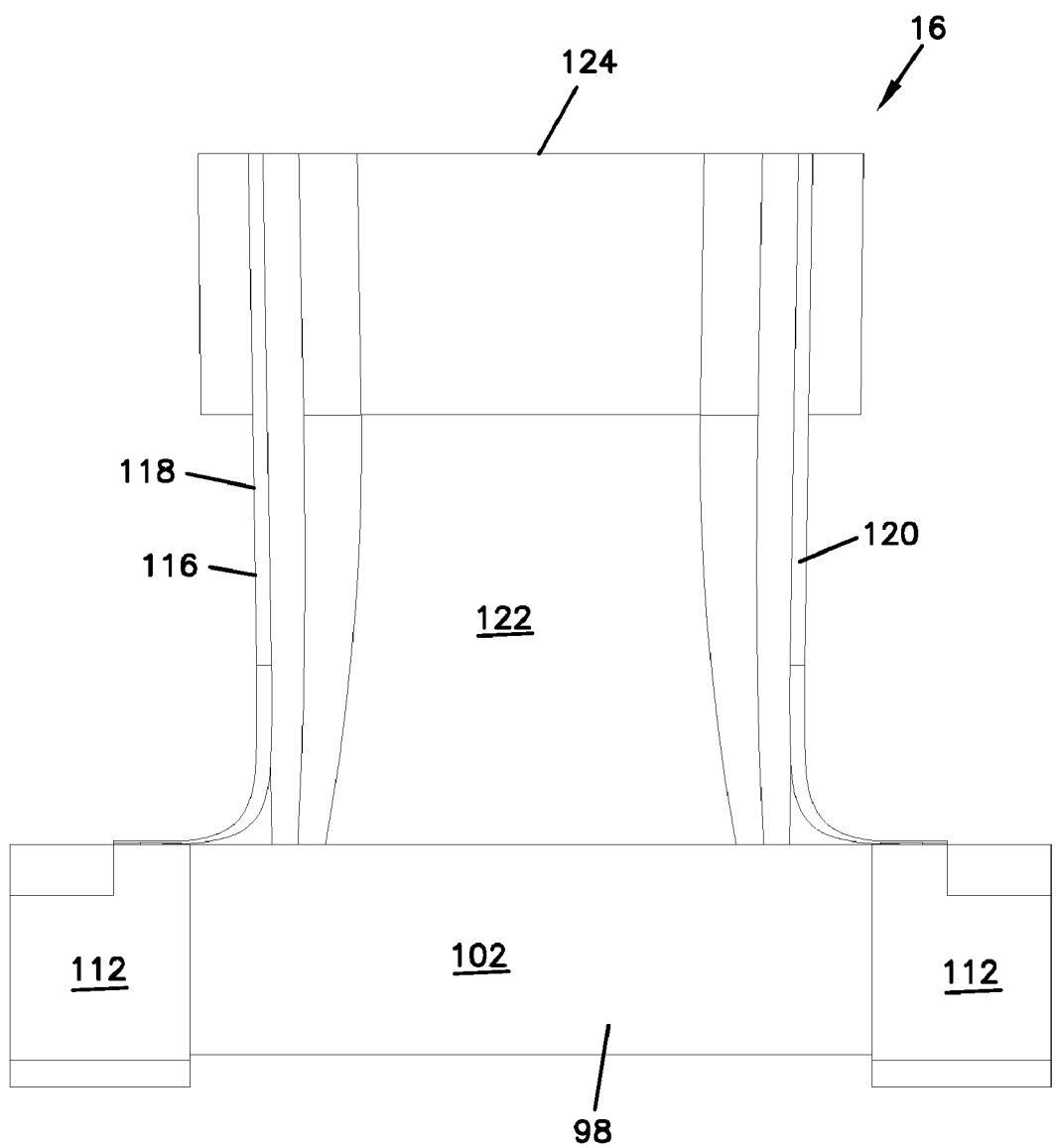
FIG. 7 is a front view of the drop-in device of FIG. 6.
Figure 8:
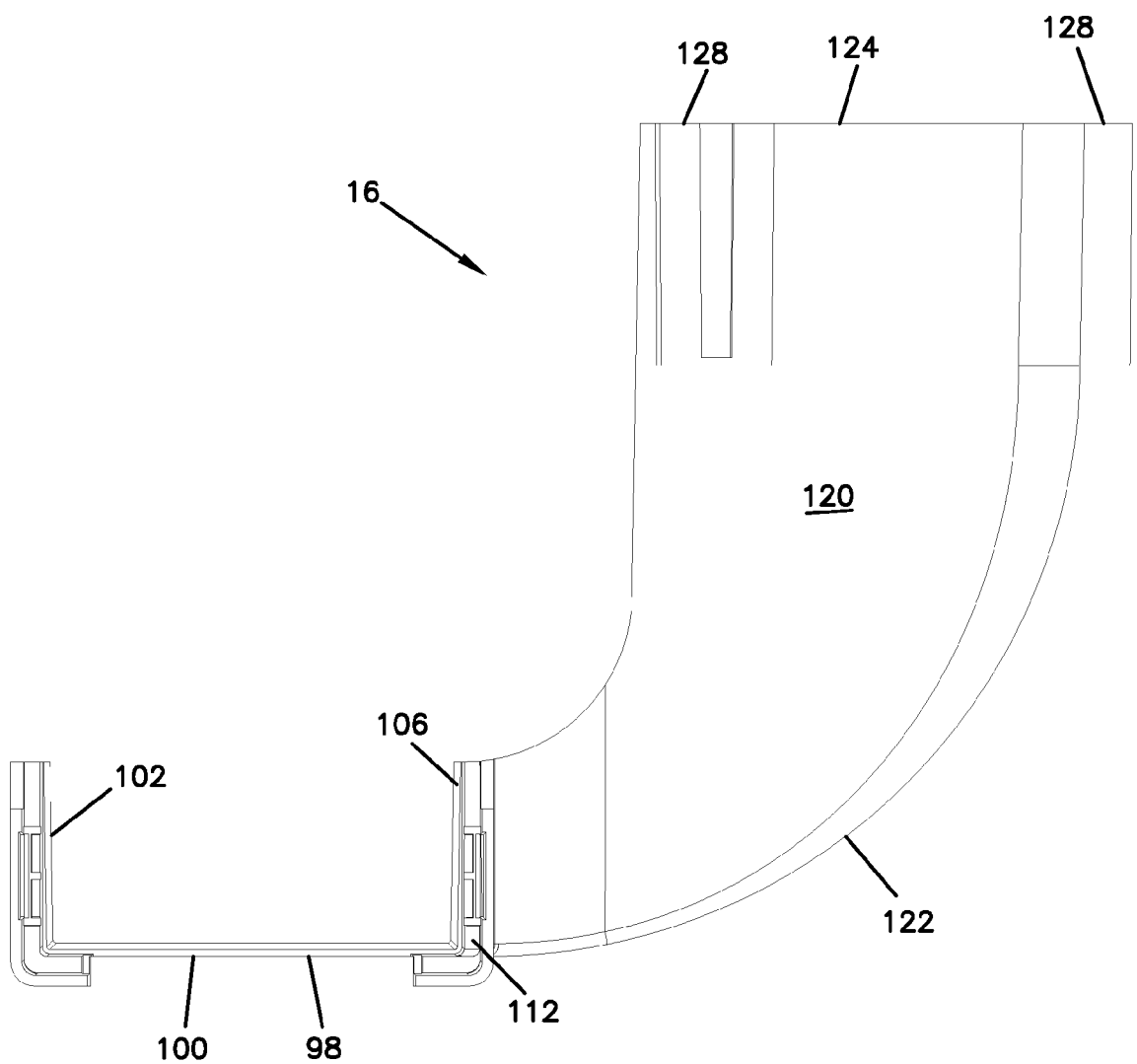
FIG. 8 is a side view of the drop-in device of FIG. 6.
Figure 9:
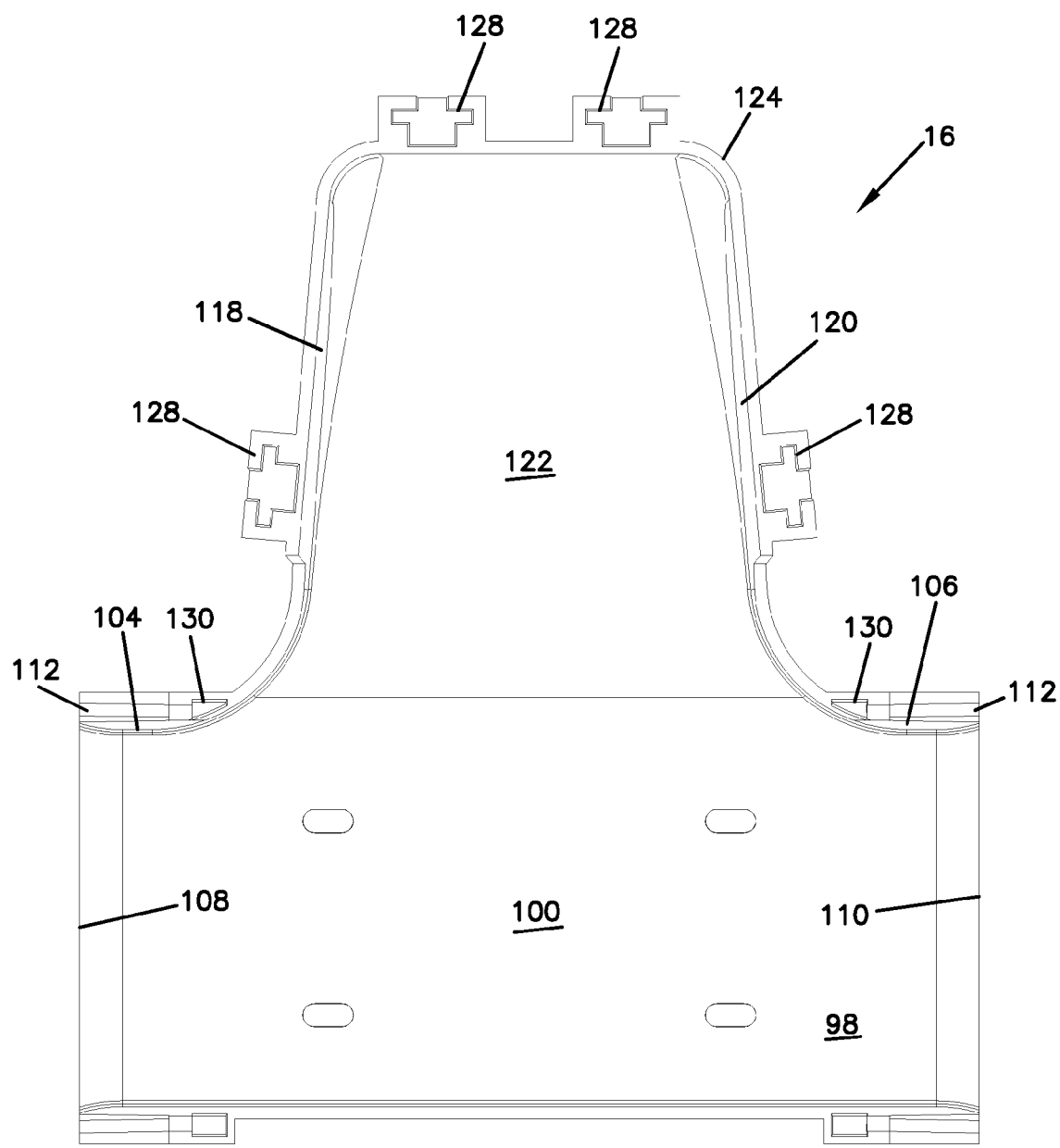
FIG. 9 is a top view of the drop-in device of FIG. 6.

FIG. 1 shows an example embodiment of a fiber routing system 10 for protecting and organizing cables, such as fiber optic cables, entering into cabinets and racks. System 10 can be mounted to a cabinet 12 as shown in FIG. 2. System 10 mounts to supporting structures on or within cabinet 12. System 10 defines an entry location 14 including a drop-in device 16 which protects and organizes cables traveling vertically downwardly into a horizontal portion of system 10.

In addition to drop-in device 16 of system 10, other system components are included for protecting and organizing cables within cabinet 12. At entry location 14 a trumpet flare 18 is provided for connection to drop-in device 16. Drop-in device 16 connects to a lateral trough 20. Two horizontal T's 22 create further cable pathways. Additional lateral troughs 24 mount to horizontal T's 22. Down elbows 26 can be provided for creating cable pathways which lead from horizontal sections to vertically downward sections within cabinet 12. Cables entering at entry location 14 can be transported to one or more of exits 30 defined by down elbows 26. Exits 30 are positioned adjacent to vertical fiber management troughs 34 positioned in each corner 40, 42, 44, 46 of cabinet 12. Cabinet 12 includes various frame members 50 defining the shape of cabinet 50, as well as equipment mounting locations, or cable termination locations. A support bar 52 may also be mounted to cabinet 12.

A variety of cabinets 12 are used in the telecommunications industry. A wide variety of sizes and shapes may be provided for cabinets 12. Supports 52 and other structures may be positioned differently between different cabinets 12. System 10 is shown fitting within cabinet 12. For a different cabinet 12, system 10 and its components can be arranged differently. For example, the lateral troughs 20, 24 can be provided with different lengths. A different number of exits 30 can be provided, as desired. Further, their relative locations to drop-in device 16 and lateral trough 20 can be varied, as desired, by using different system components.

Drop-in device 16 is compact in design for transporting vertically extending cables, such as from a vertically located raceway system of the types shown in U.S. Pat. Nos. 5,067,678; 5,316,243; 5,752,781; 6,709,186; 6,715,719 hereby incorporated by reference.

Referring now to FIGS. 6 through 13, drop-in device 16 includes a horizontal portion 98 including a base 100 and a front wall 102. Opposite rear curved walls 104, 106 extend on an opposite side of base 100. Base 100 also includes first and second ends 108, 110. Each end 108, 110 include a coupler device 112 for coupling to other system components. Extending from base 100 between rear curved walls 104, 106 is upper portion 116 defined by side walls 118, 120 and a curved bottom wall 122. Curved bottom wall 122 receives vertically extending cables entering at end 124 and transports them to base 100, without exposing the cables to any sharp edges which could damage the cables through bends which go below the minimum bend radius. As shown, front wall 102, and rear curved walls 104, 106 are taller than side walls 118, 120 at end 124.

Figure 10:
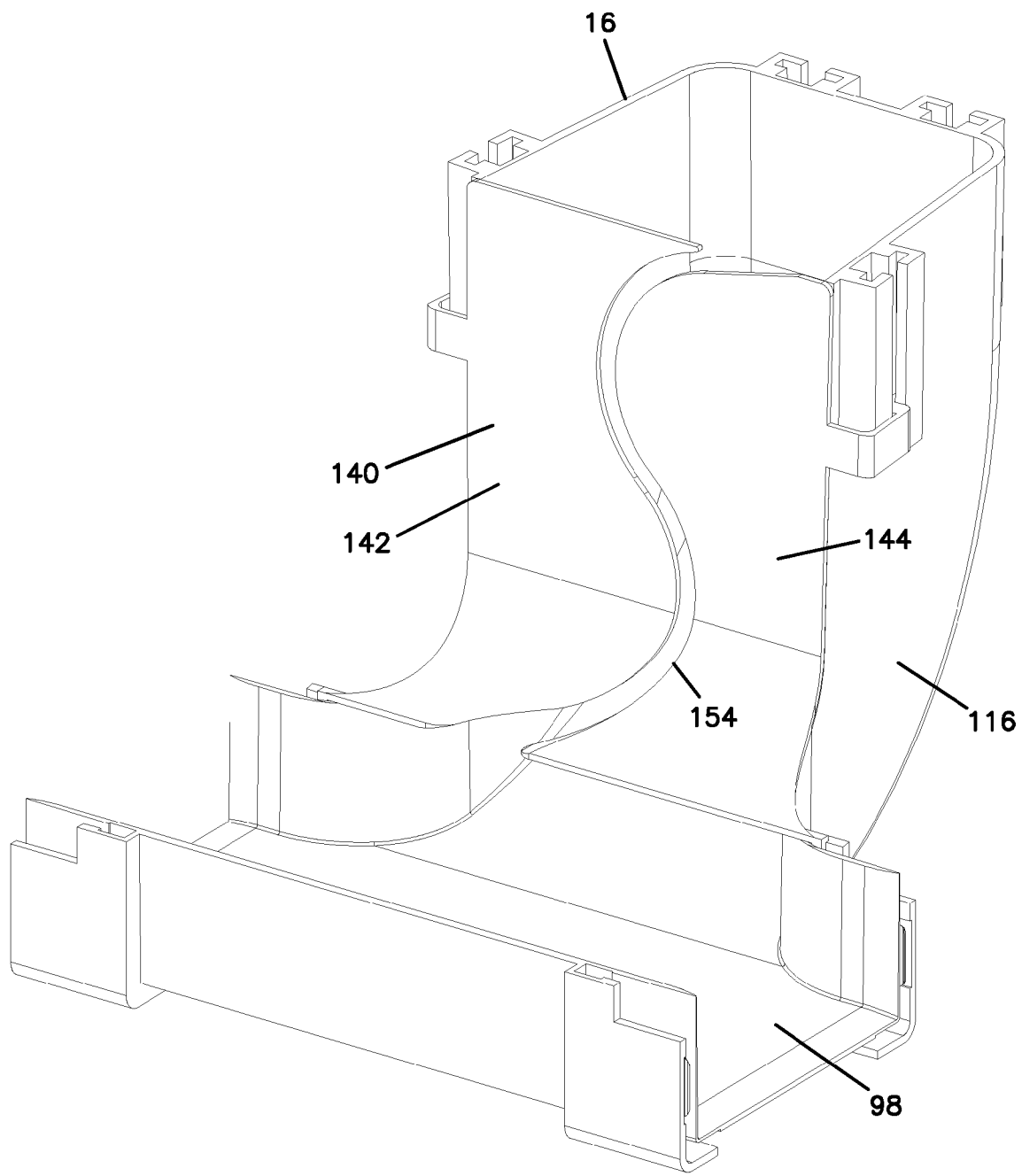
FIG. 10 is a perspective view of the drop-in device of FIG. 6 including a cover.
Figure 11:
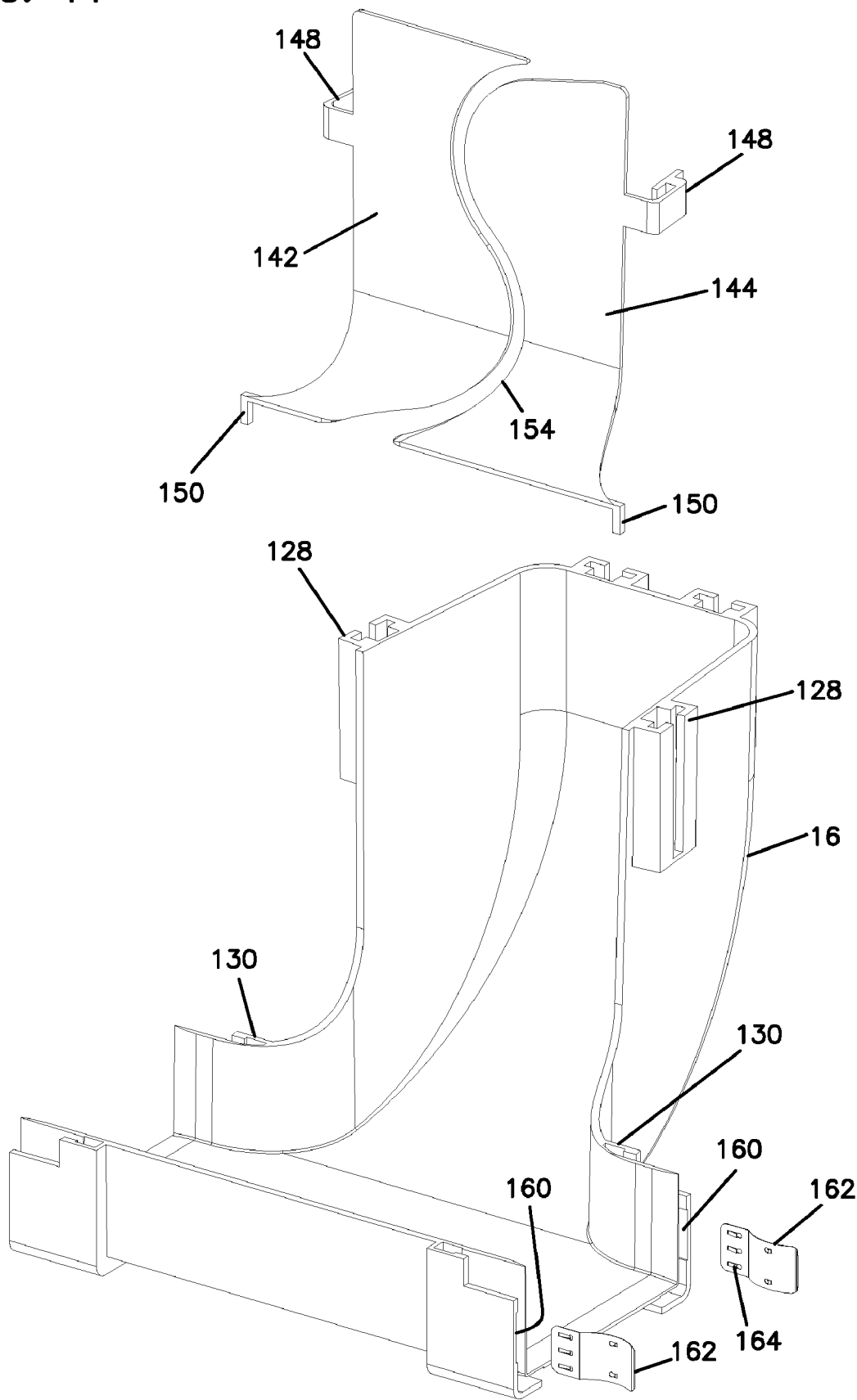
FIG. 11 is an exploded perspective view of the drop-in device of FIG. 10.

End 124 of upper portion 116 includes a plurality of T slots 128. T slots 128 can be used to mount to other system components. In the example embodiment, end 124 mounts to trumpet flare 18. Rear walls 104, 106 include outer pockets 130. Referring now to FIGS. 10 and 11, drop-in device 16 is shown with a cover 140 including first and second portions 142, 144. Each portion 142, 144 include a tab 148 for receipt in one of the T slots 128. Each portion 142, 144 include a second tab 150 for receipt in one of pockets 130. Together, portions 142, 144 define a curved gap 154 in which a cable can be manually located for adding or removing a cable from within drop-in device 16. However, due to the curved shape of curved gap 154, a cable is not likely to fall out or be pulled out during maintenance or access to other cables.

Figure 13:
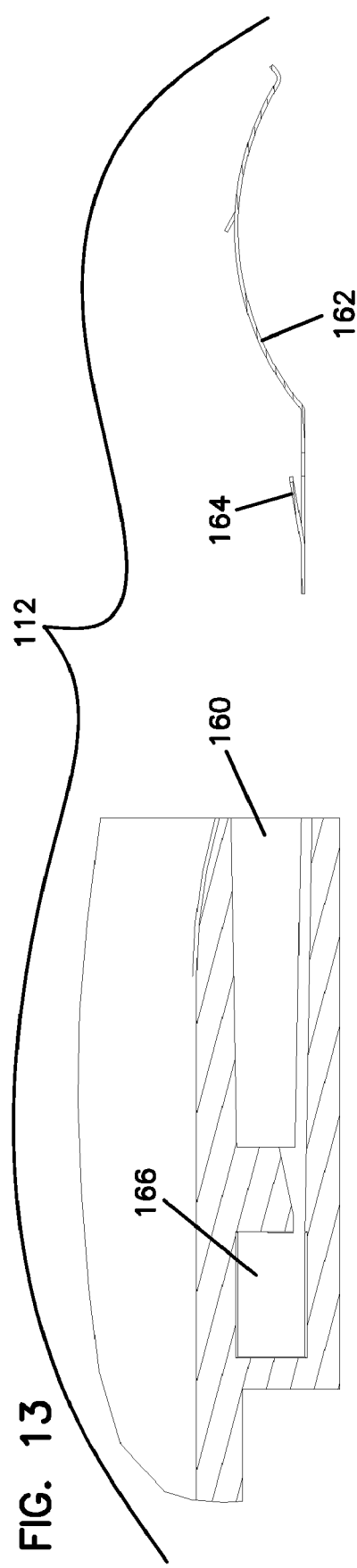
FIG. 13 is an exploded cross-sectional view of the coupling of FIG. 12.
Figure 12:
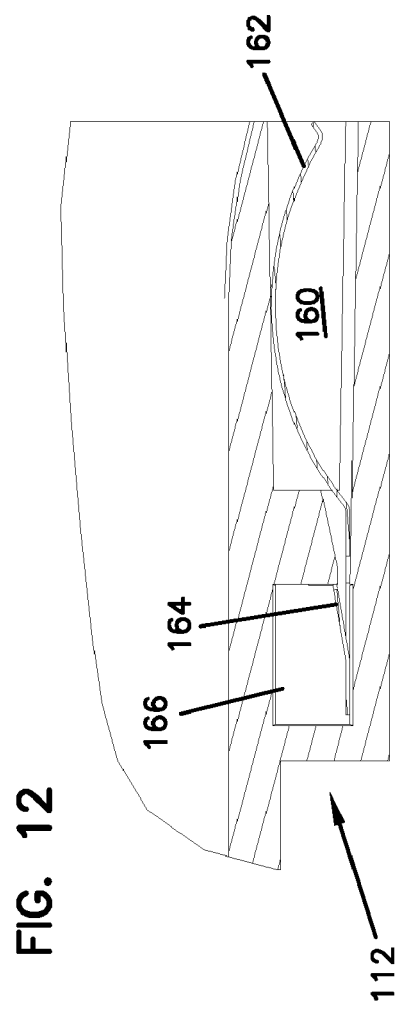
FIG. 12 is a cross-sectional view of a portion of the coupling of the drop-in device of FIG. 6.
Figure 14:
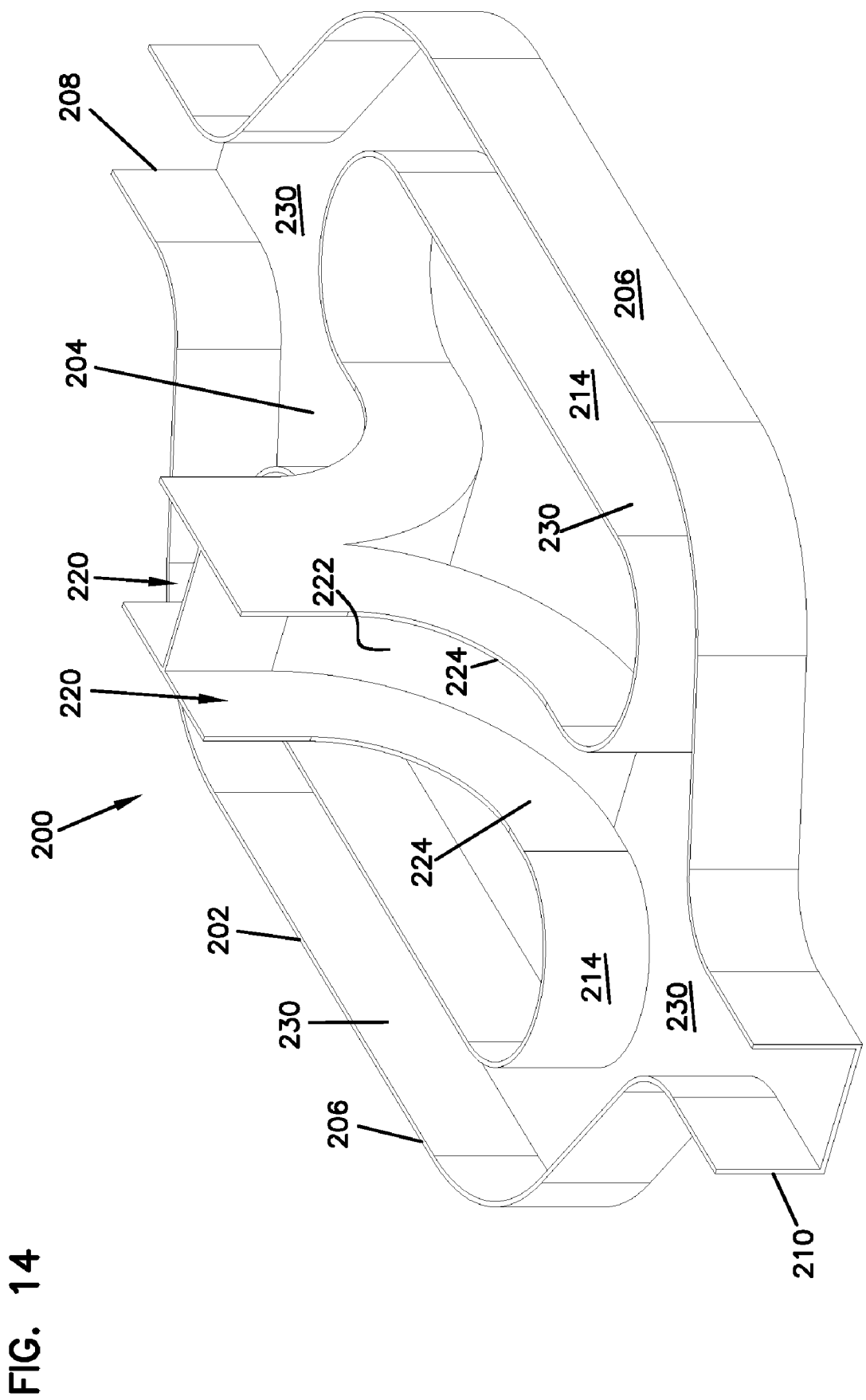
FIG. 14 is a top perspective view of an alternative embodiment of a fiber routing system.
Figure 15:
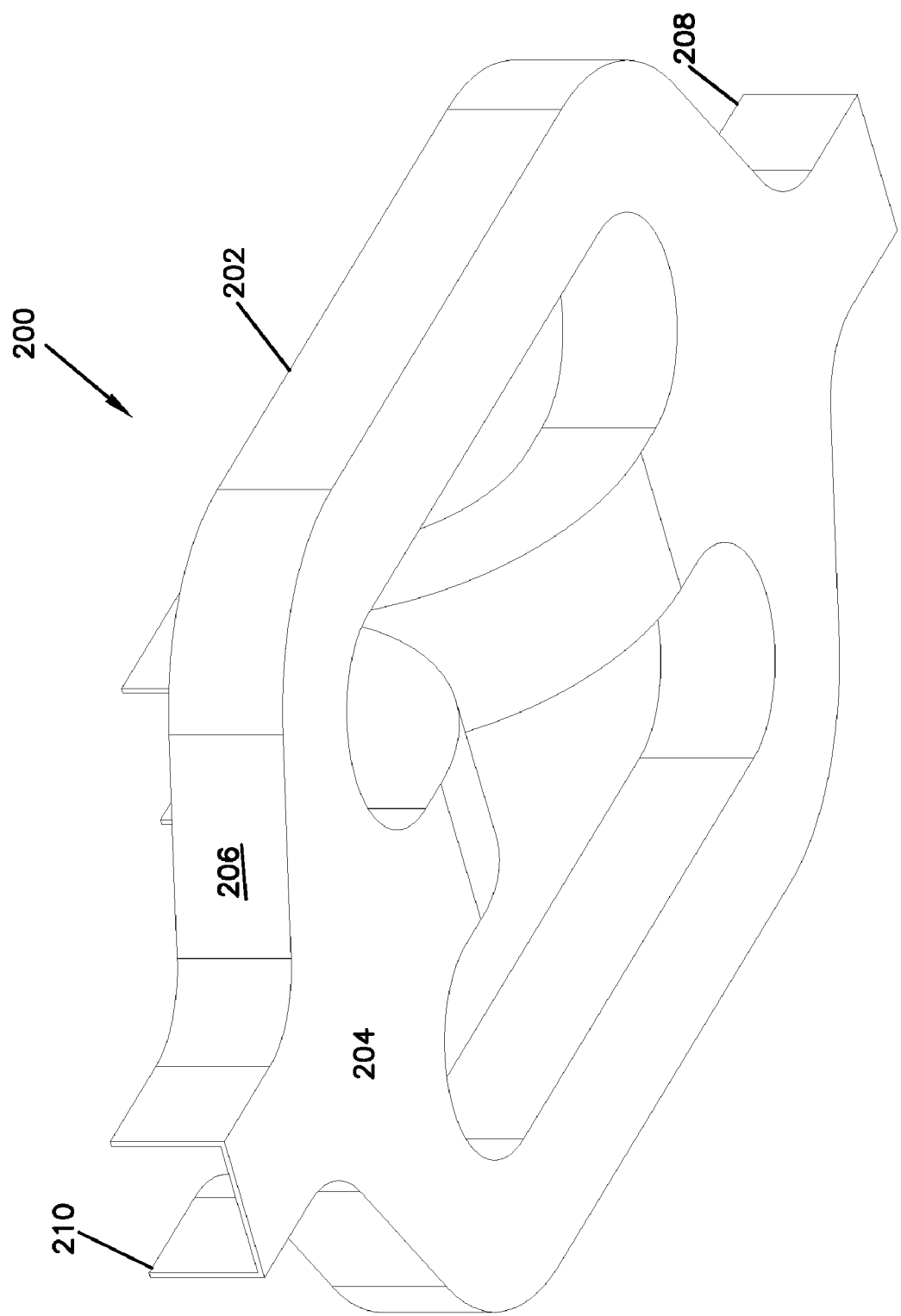
FIG. 15 is a bottom perspective view of the fiber routing system of FIG. 14.
Figure 19:
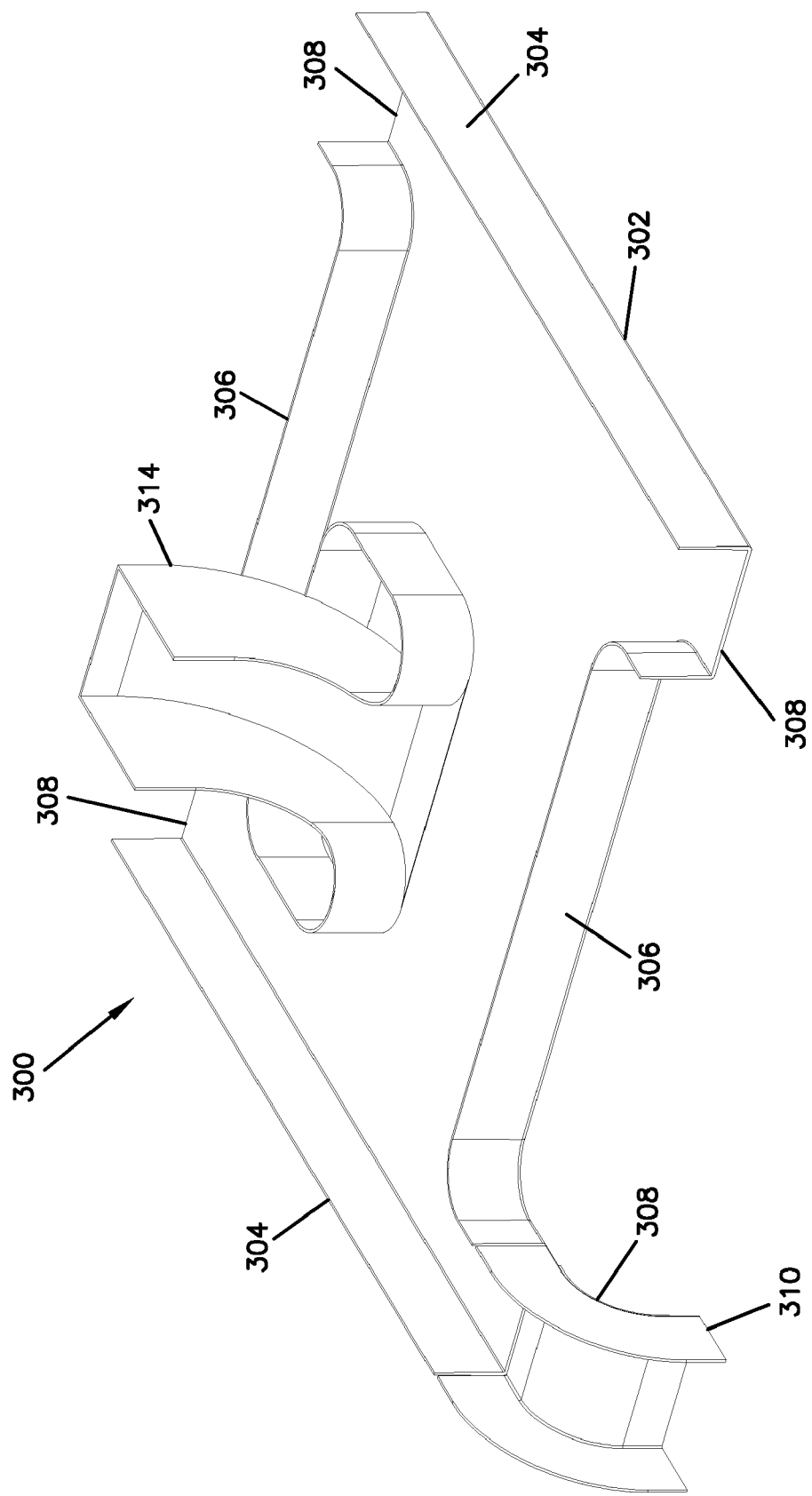
FIG. 19 is a top perspective view of another alternative embodiment of a fiber routing system.
Figure 21:
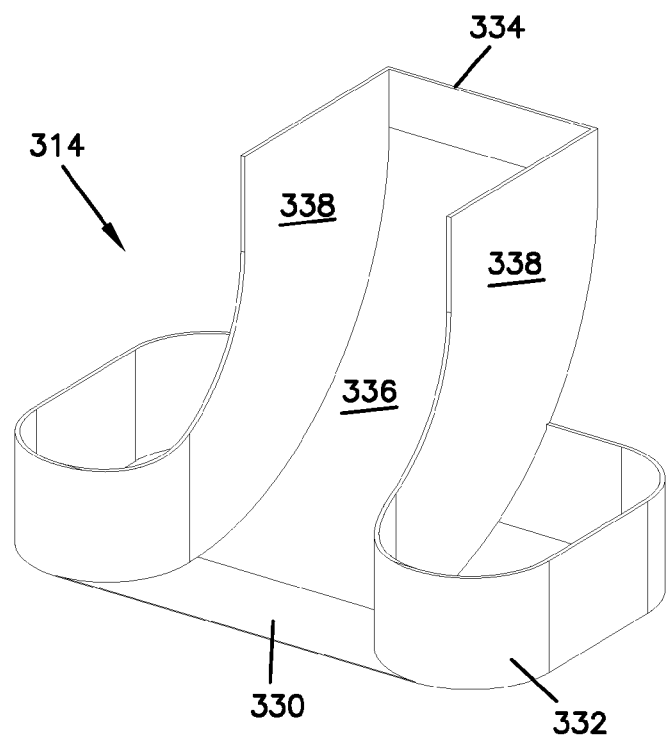
FIG. 21 is a top perspective view of a drop-in element of the fiber routing system of FIG. 19.
Figure 20:
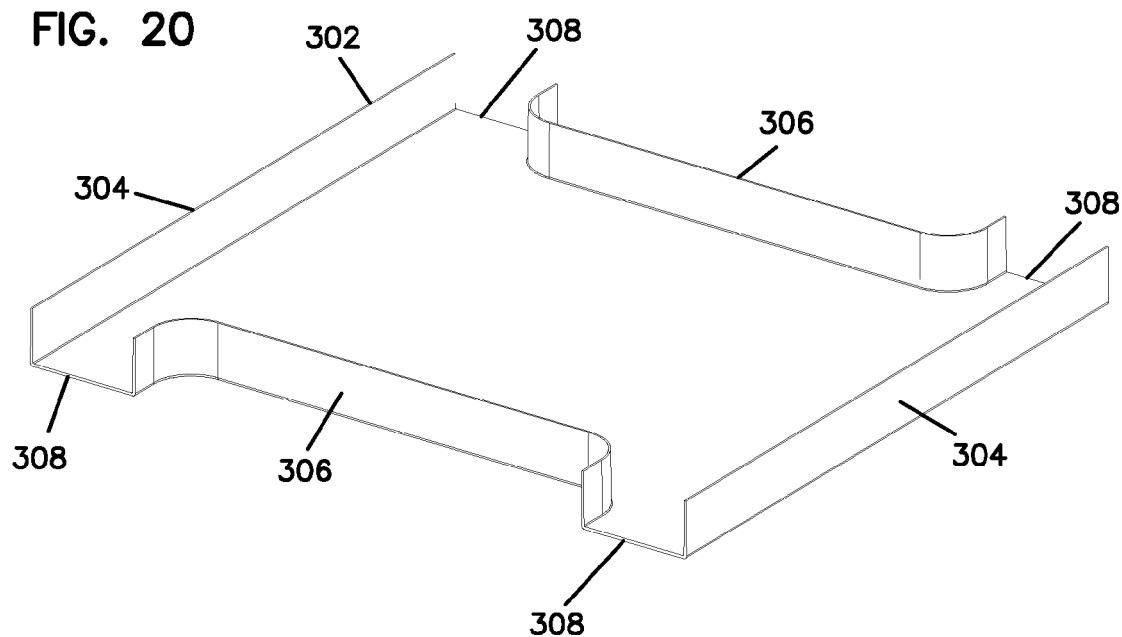
FIG. 20 is a top perspective view of a base element of the fiber routing system of FIG. 19.
Figure 22:
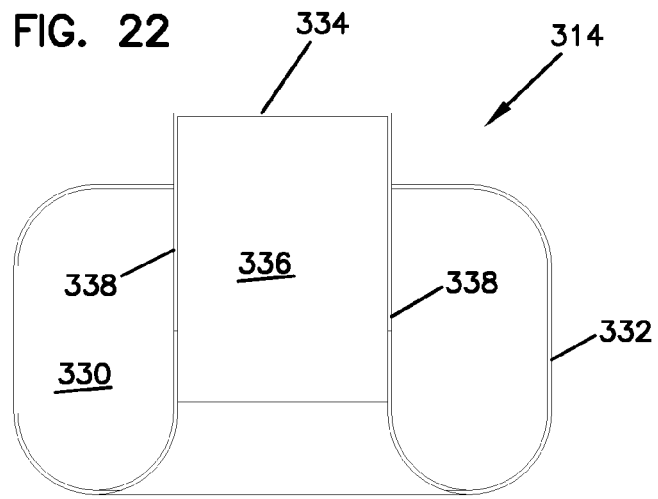
FIG. 22 is a top view of the drop-in element of FIG. 21.
Figure 23:
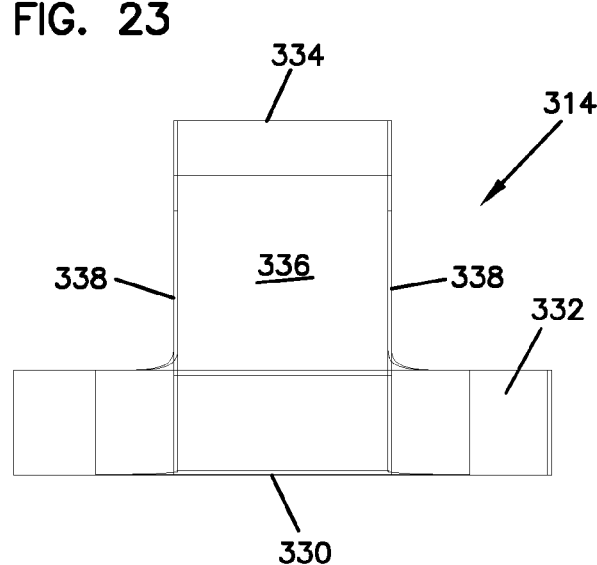
FIG. 23 is a first side view of the drop-in element of FIG. 21.
Figure 24:
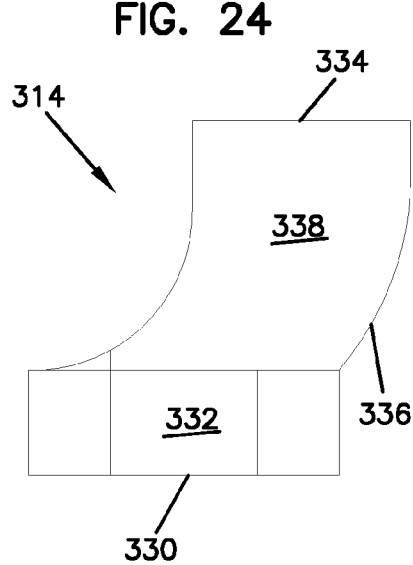
FIG. 24 is another side view of the drop-in element of FIG. 21.

Referring now to FIGS. 12 and 13, each coupler device 112 defines a chamber 160 including a spring 162. Spring 162 engages a surface on the adjacent system component inserted into chamber 160 to hold the system components together. Tabs 164 on spring 162 are received in area 166 to hold springs 162 to drop-in device 16. Drop-in device 16 is shown including an integrated coupling which helps reduce the overall size of system 10. Another example of an integrated coupling is shown in U.S. Pat. No. 7,315,680 hereby incorporated by reference.

Drop-in device 16 is preferably constructed as a one-piece molded body with a separate cover 140, and separate coupling springs 162. By constructing device 16 with a one-piece design for the horizontal and vertical portions, device 16 can be used around and within a variety of different cabinets where device 16 fits into a small space.

As shown in FIGS. 1 through 5, system 10 includes cable management spools 60, 62 for use in cable management. One particular use of spools 60, 62 is to store slack wrapped one or more times around one or both of spools 60, 62. Spools can be snap mounted to each horizontal T 22, or other system component as desired.

Referring now to FIGS. 14 through 18, an alternative embodiment of a fiber routing system 200 is shown for mounting to a cabinet, such as cabinet 12 or another cabinet for receiving the cables dropped down into the cabinet. System 200 can be used with other system components such as the lateral troughs 20, horizontal Ts 22, and down elbows 26, and other components. Fiber routing system 200 preferably is constructed as a single piece device 202 including a base 204 and side walls 206. Device 202 includes two exits 208, 210. Device 202 includes interior walls 214. Two curved lead in troughs 220, arranged back to back, are provided for receiving the cables dropped into device 202. Each curved lead in trough 220 includes a curved base 222 and side walls 224. Cables entering device 202 can exit at one of exits 208, 210 or can be wrapped around interior walls 214, such as for storage before exiting device 202.

Referring now to FIGS. 19 through 24, another example embodiment of a fiber routing system 300 is shown, such as for use with cabinet 12, or other cabinets. Fiber routing system 300 includes a base 302 which includes side walls 304, 306. Four exits 308 are provided. A downspout 310 can be connected to each of exits 308. A drop-in element 314 can be mounted to base 302. In one embodiment, drop-in element 314 can be mounted in a variety of locations on base 302 as desired. Each drop-in element includes a base 330 and a side wall 332. A curved lead in trough 334 includes a curved base 336 and walls 338. Spools and other cable management devices can be added, as desired, to base 302.

Figure 25:
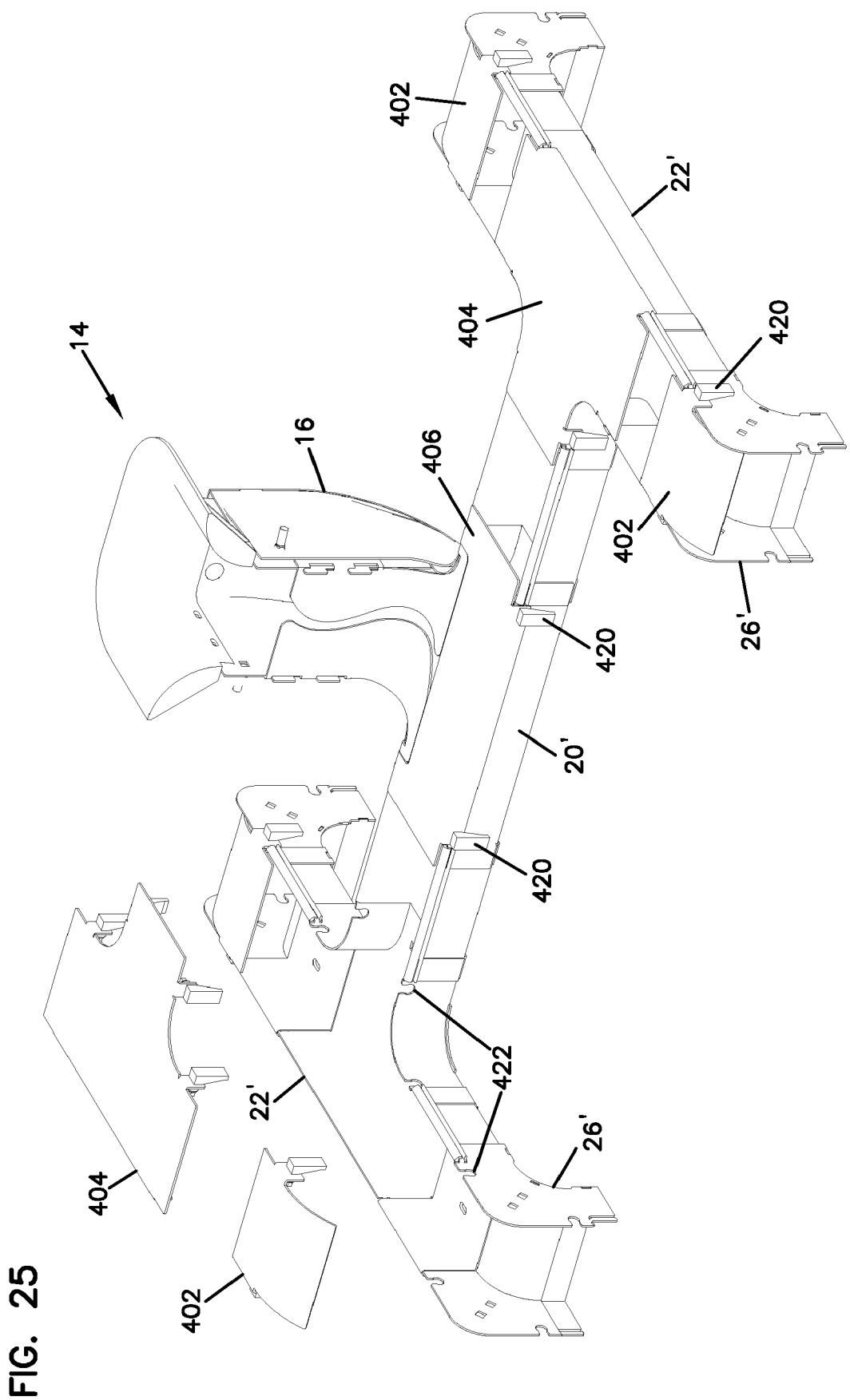
FIG. 25 and FIG. 26 are top perspective views of another embodiment of a fiber routing system similar to the system of FIG. 1, showing trough covers.
Figure 26:
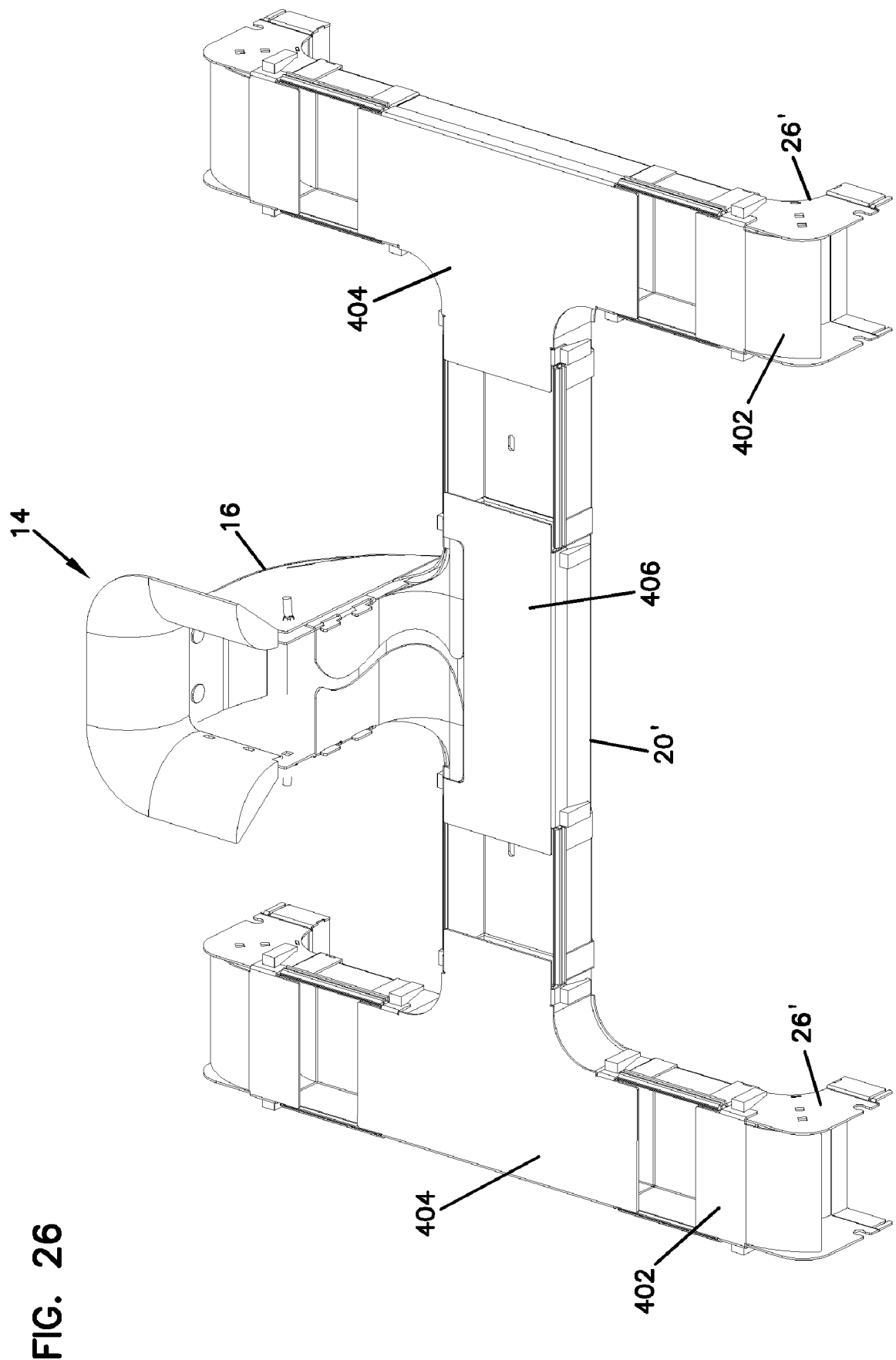

Referring now to FIGS. 25 and 26, various of the troughing elements 20', 22', 26' similar to elements 20, 22, 26 in system 10 are shown with covers 402, 404, 406 to protect cables within the system. Covers 402, 404, 406 mount with swell latches 420 which fit into slots 422 on elements 20', 22', 26'. Cover 402 is curved. Cover 404 is T shaped. Cover 406 is generally planar.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A telecommunications cabinet comprising:
   a generally rectangular cabinet body having four upright vertical supports, and four horizontal supports that define an upper area of the cabinet, and
   a cable drop in system positioned within the cabinet body, the drop in system including:
   (1) a drop in device extending upward with a distal portion extending above the cabinet body, wherein the drop in device has an up elbow shape including an integral construction having a horizontal portion including a base and a front wall, opposite rear curved walls extending on an opposite side of the base, the base further including first and second ends, each first and second end including an integral coupling device, and an upper portion extending from the base between the rear curved walls, the upper portion defining two vertical side walls and a curved bottom wall;
   (2) two horizontal T's connected to the first and second ends of the drop in device, each horizontal T defining two cable outlets;
   (3) a down elbow connected to each of the two cable outlets for each of the horizontal T's; and
   (4) a vertical cable trough positioned under each down elbow.

2. The cabinet of claim 1, wherein the drop in device includes a vertical cover over the upper portion extending from each of the vertical side walls.

3. The cabinet of claim 2, wherein the vertical cover includes a curved central slot.

4. The cabinet of claim 1, wherein each horizontal T includes a T shaped cover.

5. The cabinet of claim 1, wherein each down elbow includes a curved cover.

6. The cabinet of claim 1, wherein the drop in device includes a horizontal cover having a generally planar shape.

7. The cabinet of claim 1, further comprising a spool positioned within each horizontal T.

8. The cabinet of claim 1, wherein the front wall and the rear curved walls define a first height from the base, wherein the vertical side walls define a maximum height from the rear curved wall at a distal end away from the base, wherein the maximum height is greater than the first height.

9. A cable drop in device comprising:
a body having an elbow shape including an integral construction having a horizontal portion including a base and a front wall, opposite rear curved walls extending on an opposite side of the base, the base further including first and second ends, and an upper portion extending from the base between the rear curved walls, the upper portion defining two vertical side walls and a curved bottom wall; and
a vertical cover over the upper portion extending from each of the vertical side walls, wherein the vertical cover includes a curved central slot.

10. A drop in device comprising:
an integral body including a base with an enlarged middle and tapered ends, and two opposite side walls around an outer periphery of the base, the side walls defining two exits on opposite ends of the base at the tapered ends, an interior wall facing each side wall, and two curved lead in troughs arranged back to back adjacent a central region of the device, the curved lead in troughs cooperating with the base, the opposite side walls and the interior walls to define a cable pathway.

11. A drop in device comprising:
a planar base with a rectangular shape and side walls around an outer periphery of the base, the side walls defining four exits adjacent to each corner of the rectangular shape of the base, the side walls including four linear portions, the linear portions defining a rectangular periphery for the planar base, the planar base including a top surface;
a drop in element mounted to the top surface of the base, the drop in element including a base portion, a side wall portion, and a curved lead in trough with a curved base that curves from a distal end to a proximal end adjacent to the base portion, the curved lead in trough including side wall members, the drop in element mounted to the base within the rectangular periphery.

* * * * *